United States Patent [19]

Nussmeier

[11] 4,363,104

[45] Dec. 7, 1982

[54] IMAGING SYSTEM HAVING MULTIPLE IMAGE COPYING AND HIERARCHICAL BUSING

[75] Inventor: Thomas A. Nussmeier, Thousand Oaks, Calif.

[73] Assignee: Hughes Aircraft Company, Culver City, Calif.

[21] Appl. No.: 189,260

[22] Filed: Sep. 22, 1980

[51] Int. Cl.³ .................... G06F 15/20; H04N 5/14
[52] U.S. Cl. ............................. 364/515; 358/166; 364/200
[58] Field of Search ............... 364/200, 515; 358/37, 358/166, 284

[56] References Cited

U.S. PATENT DOCUMENTS

| | | | |
|---|---|---|---|
| 3,983,320 | 9/1976 | Ketcham et al. | 358/166 |
| 3,996,421 | 12/1976 | Pruznick et al. | 358/166 |
| 4,127,873 | 11/1978 | Katagi | 358/166 |
| 4,213,150 | 7/1980 | Robinson et al. | 358/166 |
| 4,229,797 | 10/1980 | Ledley | 364/515 |

*Primary Examiner*—Jerry Smith
*Attorney, Agent, or Firm*—Robert M. Wallace; William J. Bethurum; William H. MacAllister

[57] ABSTRACT

A very high speed video imaging system wherein the video image from each video frame of $M_1$ columns and $M_2$ rows of video pixels is multiplexed serially by row, each image pixel corresponding to an address in said video frame; image enhancement processing is performed in real time, using r programmable processors operating on successive kernels comprising $L_1$ rows and $L_2$ columns of the image pixels. Real time image processing is made possible by multiple image copying means which furnishes multiple copies of the image pixels to the r processors, wherein each one of the processors receives a copy of only those image pixels having an address lying within an assigned range, which limits the amount of data handled by each processor for each video frame. The use of multiple image copies permits each processor to process pixels at an average rate which is reduced from the video data rate by a factor proportional to 1/r, thus permitting programmable processing to occur in real time despite the relatively slow speed of the processors and the high video data rate. The invention thus eliminates time sharing or arbitration among the plurality of processors.

16 Claims, 12 Drawing Figures

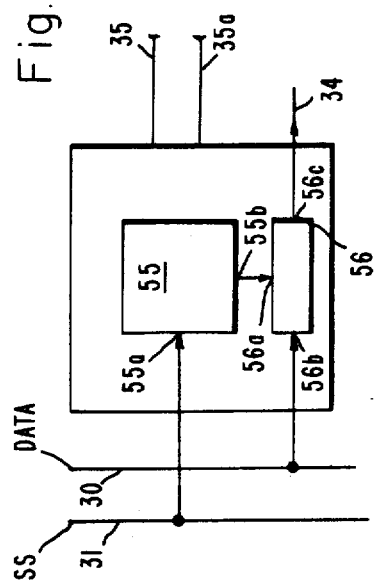
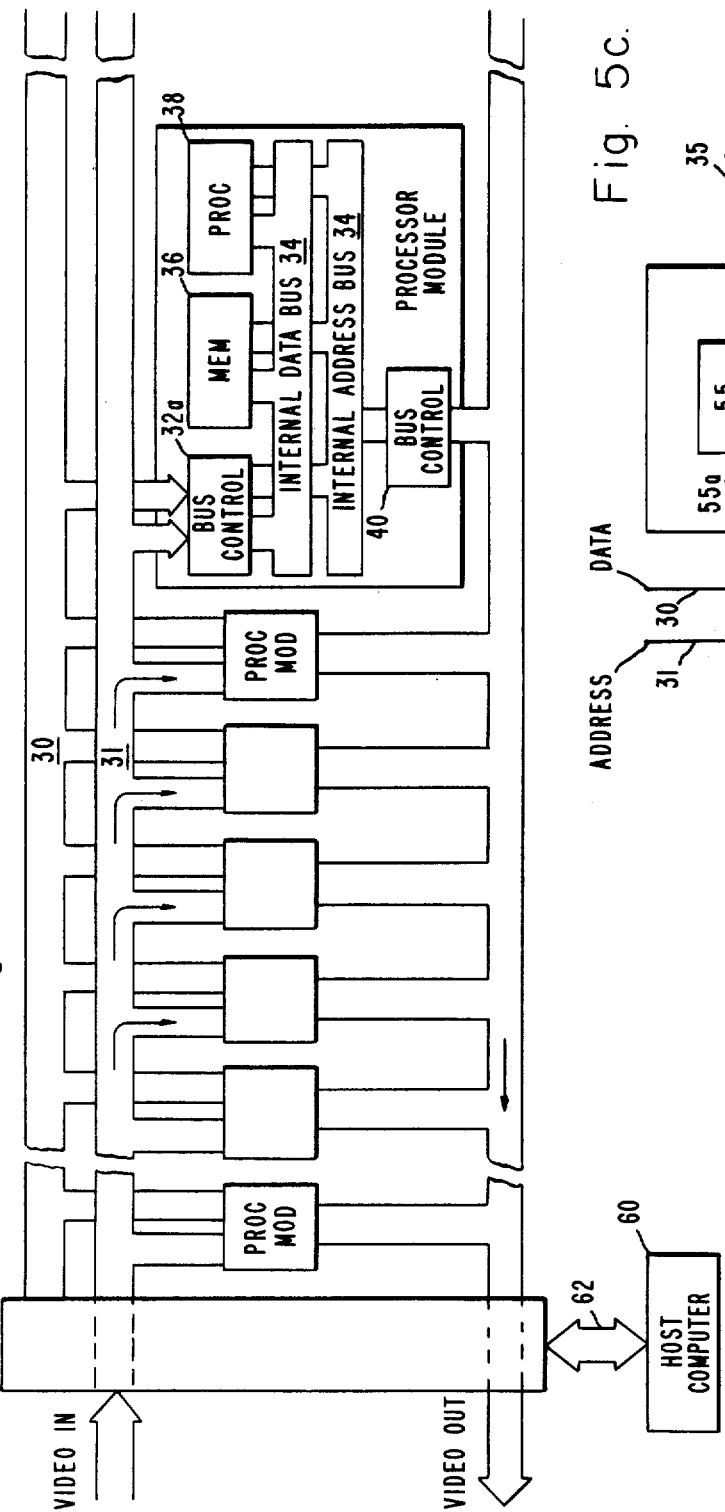

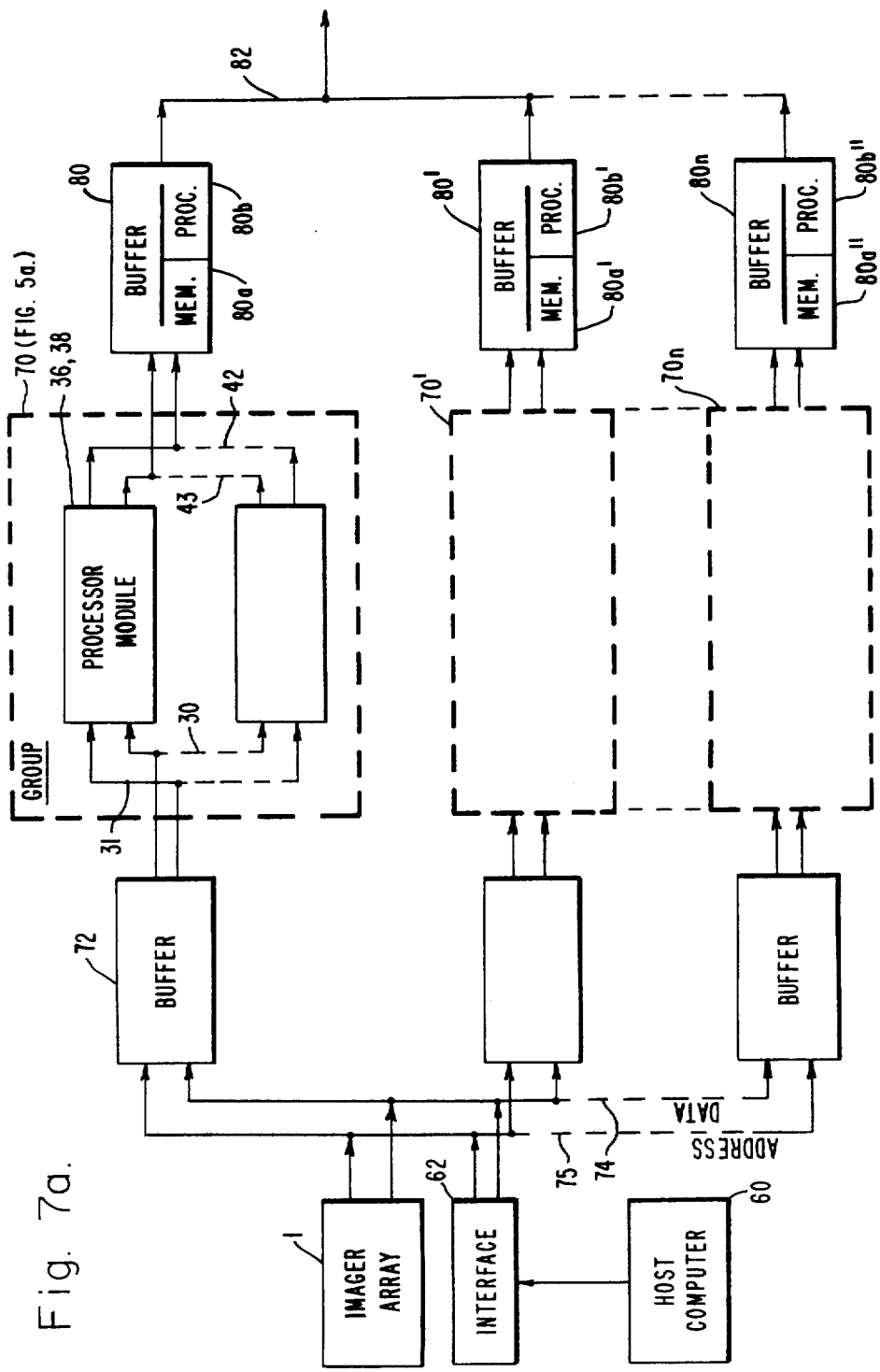

IMAGING SYSTEM HAVING MULTIPLE IMAGE COPYING AND HIERARCHICAL BUSING

TECHNICAL FIELD

The invention is related to video imaging systems such as a focal plane array of photodetectors on a semiconductive substrate, wherein the image is enhanced by real time processing of the video output using a programmed operator such as a Sobel operator executed by a programmable microprocessor to perform enhanced edge detection in the image.

BACKGROUND ART

In the rapidly developing technology of imaging systems such as infrared detector focal plane arrays, sensitivity and performance of the imager may be dramatically enchanced by processing the video data generated by the imager. Well-known algorithms are available which enhance the performance of the imager, including algorithms to perform edge detection and local averaging. Unfortunately, such processing cannot be performed in real time in practical application. For example, a standard video format may comprise a video frame generated once every 1/60th of a second, each video frame comprising 256 rows by 256 columns of image pixels. A standard edge detection operator operates on a kernel comprising 3 rows by 3 columns of image pixels, the kernel being a window which must be moved about the entire frame each 1/60th of a second. In this example, a processor programmed to perform the algorithm must operate at a computation rate of approximately 35 million operations per second. This exceeds the computation rate of most programmable processors. Thus, a programmable processor cannot perform the edge detection algorithm in real time.

As used in this specification, the term processor refers to a device which performs computations upon data stored in memory in response to instructions also stored in memory. A programmable processor is that processor in which the instruction words stored in memory may be changed by the user so that the processor operates upon the data stored in memory according to the algorithm selected by the user.

In most laboratories investigating image processing, unprocessed video data is stored in a large computer memory to permit a processor to perform, for example, an edge detection algorithm on the video data at a leisurely pace. Such an arrangement is unacceptable when the imager is to be used, for example, in a guided vehicle in which the results of the edge detection algorithm must be available instantly to the vehicle guidance system to permit real time control.

In an attempt to solve the problem of real time image processing by substituting a plurality of processors which share each video frame among themselves, the communication time required for all the processors to time share the video data among themselves substantially offsets the advantage gained by increasing the number of processors. In an attempt to eliminate the time consumed by time sharing communication between processors, an arbitrator may be imposed which controls the distribution of the video data to each of the individual processors, thus eliminating the need for processor-to-processor time sharing communication. Unfortunately, the arbitrator itself imposes time delays required by the sorting operation performed by the arbitrator, thus offsetting the advantage gained by using a plurality of processors. Accordingly, the computation rate of available programmable processors remains a limitation on the video data rate at which real time image processing can be performed, a significant disadvantage.

Currently available real time image processors are hard-wired systems which, because they do not execute programmed instructions, can perform a sufficient number of operations per second which are comparable to or exceed the video data rate of most video systems. Such hard-wired processors are not programmable, a significant disadvantage when versatility is a system requirement. For example, there are several image enhancement algorithms which may be useful under different circumstances encountered by the video imager. It may be desirable to change instantly from a local averaging algorithm to an edge detection algorithm while viewing a particular scene. Such versatility vastly enhances the usefulness of the video imager and is not possible using a hard-wired processor. Thus, it has remained a goal in the art to perform real time programmable image enhancement processing on high speed video data formats.

SUMMARY OF THE INVENTION

Programmable real time image processing of high speed video data is made possible in the present invention by simultaneously supplying multiple copies of the video data to a plurality of programmable image processors. The video data is first sorted through a hierarchical bus structure, portions of each video frame being sent to progressive stages of the hierarchical bus, the pixel processing data rate of the output stage of the hierarchical bus structure being reduced from the input stage by an amount substantially proportional to the number of processors utilized. The term "pixel processing data rate" as used herein refers to the average number of pixels or video data words processed per second after the video data words have been received from the previous stage and stored. Sorting of the video data is accomplished at each stage of the hierarchical bus structure by programmable bus control means which sort the video data in accordance with predetermined address ranges.

The imaging system includes a source of video frames, each fame comprising $M_1$ columns and $M_2$ rows of video data words which are multiplexed serially by row, each video data word corresponding to a pixel in the video frame. The image is enhanced by operating on successive kernels of words in the video frame, each kernel comprising $L_1$ columns and $L_2$ rows centered on an operand pixel. The processing is accomplished by a plurality of r main processors and r random access memories, individually associated with the r processors. A plurality of r bus controllers sorts the video data words before they are sent to the random access memories. Each bus controller selects a block of video data words which form a complete set of kernels corresponding to one particular row of image pixels. The selected data words are sent to a corresponding one of the random access memories so that its processor can generate enhanced values for each operand pixel in the corresponding row of image pixels.

A data bus simultaneously distributes the data words from the video source to all of the r bus controllers. Each one of the r bus controllers selects a block of data words which has been assigned to the individual bus controller. A plurality of r internal data buses carries the sorted video data words to individual ones of the r random access memories storing video data for processing by a corresponding one of the r processors. In particular, the jth one of the r internal data buses carries the block of data words selected by the jth bus controller to the jth one of the r random access memories. Furthermore, the jth internal bus permits the jth processor to access the selected data words in the jth random access memory. While the first data bus must operate at the same pixel processing data rate as the video source, each internal data bus and its corresponding random access memory and processor operate at a second pixel processing data rate, after the receipt and storage of the block of data words, which is reduced from the first rate by a factor approximately equal to 1/r.

The advantage is that extra time is not consumed by time sharing communcation among the plurality of processors. Thus, an extremely high video data rate may be supported using relatively slow processors merely by increasing the number of processors and the number of internal buses and bus controllers. Accordingly, programmable image processing may be accomplished in real time without regard to the speed of the processors which are used. Significantly, because each processor is programmable, the image enhancement algorithm performed by the processors may be changed during operation of the imager, greatly enhancing its versatility. Thus, while viewing a particular scene in real time, the imager may first perform a local averaging algorithm to enhance the image in one fashion and may immediately be reprogrammed to perform an edge detection algorithm on the video data to provide additional information. The resulting system will support a 5 megahertz video data rate using currently available microprocessors.

The invention will also support video data rates of 30 megahertz using currently available microprocessors with the addition of a second tier of hierarchical busing. The second tier comprises a plurality of s buffers, each buffer controlling the transmission of data words between the video data source and a corresponding fraction r/s of the r bus controllers. Each buffer includes a buffer memory and a first buffer bus controller connected to the data bus to receive data words from the video data source. The first buffer bus controller selects and stores in the buffer memory a fraction or block of the video data words in each video frame. The buffer also includes a second buffer bus controller connected to the buffer memory for outputting the block of selected data words stored in the buffer memory to an intermediate bus connected to a particular one of the r bus controllers which sorts data to be stored in a particular one of the r random access memories. The data bus, as previously described, operates at a first pixel processing data rate equal to the video source, while the intermediate data bus operates at a second pixel processing data rate reduced from the first data rate by a factor substantially proportional to 1/s, and the internal data bus operates at a pixel processing data rate further reduced from the first data rate by a factor substantially proportional 1/(r×s). Further enhancement of the processing capabilities may be achieved in this invention by the addition of additional tiers of buffers sequentially controlling the sorting of selected groups of video data words through a hierarchical busing structure, thus permitting the use of currently available microprocessors to achieve real time programmable image processing for virtually any video data rate.

DESCRIPTION OF THE FIGURES

The invention is best understood by reference to the accompanying drawings, of which:

FIG. 3b is a simplified block diagram illustrating the organization of data in one of the data registers in the multiple image copying device of FIG. 3a;

FIG. 4 is a timing diagram illustrating the operation of the device of FIG. 3a;

FIG. 5b is a simplified block diagram of a single bus controller utilized in the hierarchical busing structure FIG. 5a;

FIG. 5c is a simplified block diagram of an improved version of the bus controller of FIG. 5b;

FIG. 6 is a block diagram of the preferred embodiment of the present invention;

FIG. 7a is a block diagram of an alternative embodiment of the present invention in which extremely high video data rates are supported using a plurality of data and select buffers; and FIG. 7b is a simplified block diagram of one of the data and select buffers of FIG. 7a.

DETAILED DESCRIPTION

The Problem Solved By The Invention

Figure 1:
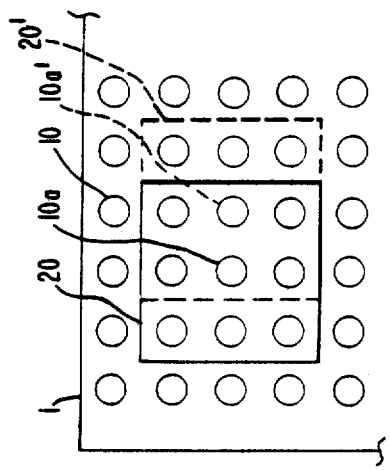
FIG. 1 illustrates the movement of the data window defining a single kernel in a video frame of image pixels.

Image sensors compatable with video systems typically comprise a planar array 1 of image pixels 10 of the type illustrated in FIG. 1, each pixel 10 being a single image sensing element which may be, for example, a semiconductive photosensitive diode. The planar image sensor array 1 of FIG. 1 may be a charge coupled device imager of the type discussed in Howes et al, *Charge Coupled Devices and Systems*, Wiley & Sons, New York (1979), pp. 241-292 and Sequin et al, *Charge Transfer Devices*, Academic Press, New York (1975) pp. 142-200, the disclosures of which are incorporated herein by reference. The photosensitive diode of each image pixel 10 generates an analog signal in response to radiation incident upon the planar array which may be converted to a digital word. If, for example, the analog signal from each pixel 10 is converted to an 8 bit digital word, the 8 bit word corresponds to one of 256 gray levels sensed by the pixel. If the imager 1 is to be compatible with standard television video interlaced format, then the planar array of FIG. 1 would have about 480 horizontal rows and 640 vertical columns of pixels 10 corresponding to a single video field. Control electronics would be operated to generate 60 fields per second. (However, the present invention is also useful with reduced resolution video systems having only 128 rows and 128 columns of pixels in a single video field.)

The sensitivity and performance of an imager of the type illustrated in FIG. 1 may be dramatically enhanced by the use of well-known image processing algorithms.

For example, the digital word output of the planar array 1 of FIG. 1 is usually multiplexed in a row-by-row serial sequence of pixels. Such serial data may be operated upon by a processor with any chosen algorithm. Algorithms are available which, for example, provide enhanced edge detection of objects in the image viewed by the imager. Such image processing algorithms are discussed in Pratt, *Digital Image Processing*, Wiley & Sons, New York (1978) and Andrews et al, *Digital Image Restoration*, Prentiss-Hall, Inglewood Cliffs, New Jersey, (1977), the disclosures of which are incorporated herein by reference. Such algorithms typically comprise a 3 by 3 matrix which operates on video data from a kernel of pixels comprising 3 rows and 3 columns of pixels. The resulting matrix operation results in an enhanced value for the data word corresponding to the operand pixel which resides in the middle of the kernel. A kernel 20 is illustrated in FIG. 1 and symmetrically surrounds operand pixel 10a. The 3 by 3 array of pixels comprising the kernel 20 of video data words, where the operand pixel 10a is $x_{i,j}$, is defined by the following 3 by 3 matrix:

$$X = \begin{matrix} x_{i-1,j-1} & x_{i-1,j} & x_{i-1,j+1} \\ x_{i,j-1} & x_{i,j} & x_{i,j+1} \\ x_{i+1,j-1} & x_{i+1,j} & x_{i+1,j+1} \end{matrix}$$

Enhancement of edge detection of objects contained in the image viewed by the plane array of FIG. 1 may be accomplished by operating on the kernel 20 with the well-known Sobel operator defined by the matrices:

$$S_1 = \begin{matrix} 1 & 2 & 1 \\ 0 & 0 & 0 \\ -0 & -2 & -1 \end{matrix} \quad \text{and} \quad S_2 = \begin{matrix} 1 & 0 & -1 \\ 2 & 0 & -2 \\ 1 & 0 & -1 \end{matrix}$$

according to the following equation:

$$x'_{i,j} = |S_1 * X| + |S_2 * X|. \quad (1)$$

Processing of the Sobel operator requires that the window 20 be moved about each video frame generated from the array 1 of FIG. 1 in such a manner that each pixel 10 is eventually treated as an operand pixel 10a during successive applications of the Sobel operator as the kernel 20 is moved into successively different locations in the video frame. Thus, FIG. 1 illustrates that the kernel 20 is located in the solid line position during one operation in which the kernel matrix and the Sobel operator matrix are multiplied in accordance with equation (1) to generate an enhanced value for the operand pixel 10a. The kernel 20 is subsequently moved to the dashed line position 20' in which the pixel 10a' becomes the operand pixel and the Sobel operator is applied to the kernel 20' to generate an enhanced value for the pixel 10a'. Thus, in the example of the reduced resolution video system discussed above, it should be apparent that each video frame of 128 rows and 128 columns of pixels requires about 16,000 applications of the Sobel operator to generate an enhanced value for each pixel. Inasmuch as the imager output is multiplexed at the rate of 60 video fields per second, 960,000 applications of the Sobel operator are required each second. If each pixel corresponds to the video data word comprising 8 bits, it is readily seen that the bit rate is approximately 7,680,000 bits per second. Because the foregoing bit rate exceeds the capacity of most currently available programmable micro-processors, the imager may be multiplexed at the standard video rate only if the video data is stored in a large memory and the Sobel operator algorithm is performed by a processor at a slower rate, introducing a long delay between the time that a video frame is viewed by the imager and the enhanced video data is available, a significant disadvantage.

Figure 2:
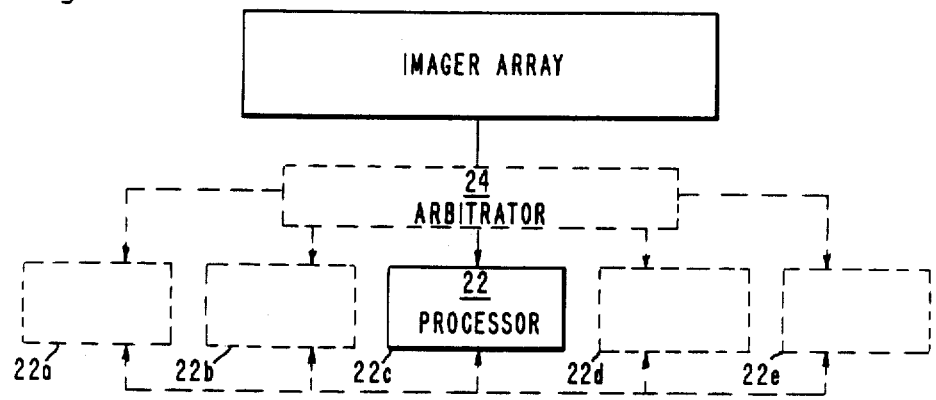
FIG. 2 is a simplified block diagram illustrating some prior art techniques for image processing.

Referring to FIG. 2, the planar array 1 of image pixels 10 is connected to a processor 22. As discussed above, the data rate of the video output from the image array 1 substantially exceeds that of the processor 22 so that the processor 22 cannot keep up with the real time output from the array 1. Accordingly, real time processing of the image data is not possible.

If the imager array 1 is to be used as a sensor in a guided vehicle requiring the instant availability of video data compatible with its guidance system, it is not possible to provide the image enhancement processing of the video data discussed above unless a hard-wired logic system is used in place of the processsor 22. Such hard-wired logic systems can be made to operate at a data rate compatible with the multiplexed video rate of the imager array 1. Unfortunately, the hard-wired logic can perform only one specific algorithm to which it is dedicated. Thus, the use of hard-wired logic to perform an image enhancement algorithm severely limits the versatility and usefulness of the imager array 1. Specifically, it may be desirable to alternately perform edge detection enhancement (using the Sobel operator) and to perform a different algorithm such as local averaging using a local averaging operator (which may take the form of a 3 by 3 matrix comprising a plurality of numeral 1's). Furthermore, if an image enhancement operator matrix is selected having different dimensions, it is necessary to change the dimensions of the kernel. Such variations are not possible using a hard-wired logic network in place of the processor 22 of FIG. 2. Thus, it has a been a goal in the art to find a solution to the problem imposed by the slow data rate of the processor 22 so that a programmable processor may be used for real time image enhancement permitting different enhancement operators of any dimension to be instantly selected during operation of the imager array 1.

If a plurality of processors 22a-22e illustrated in dashed line in FIG. 2 time-share the video data from the image array 1, it would seem that real time programmable processing of the image data from the array 1 may be accomplished regardless of the slow data rate of the processors 22 as long as a sufficiently large number of processors are used. Unfortunately, additional processing time required to perform the time-sharing tasks, including communication between processors, results in increased computation time for each processor, which substantially reduces the advantage gained by substituting the plurality of processors 22a-22e for the single processor 22.

Although an arbitrator 24 may be imposed between the image array 1 and each of the processors 22a-e, and even though such an arbitrator 24 would perform the time-sharing task otherwise performed by the processors 22a-e, the arbitrator 24 itself would impose a time delay on the processing of data by reason of the sorting and addressing of data to each of the processors 22a-e perfomed by the arbitrator 24. This delay also reduces the advantage gained by the use of the plurality of processors 22a-22e. As a result, it has not seemed possible to perform real time programmable image enhancement processing at standard video data rates.

Multiple Image Copying

Figure 3A:
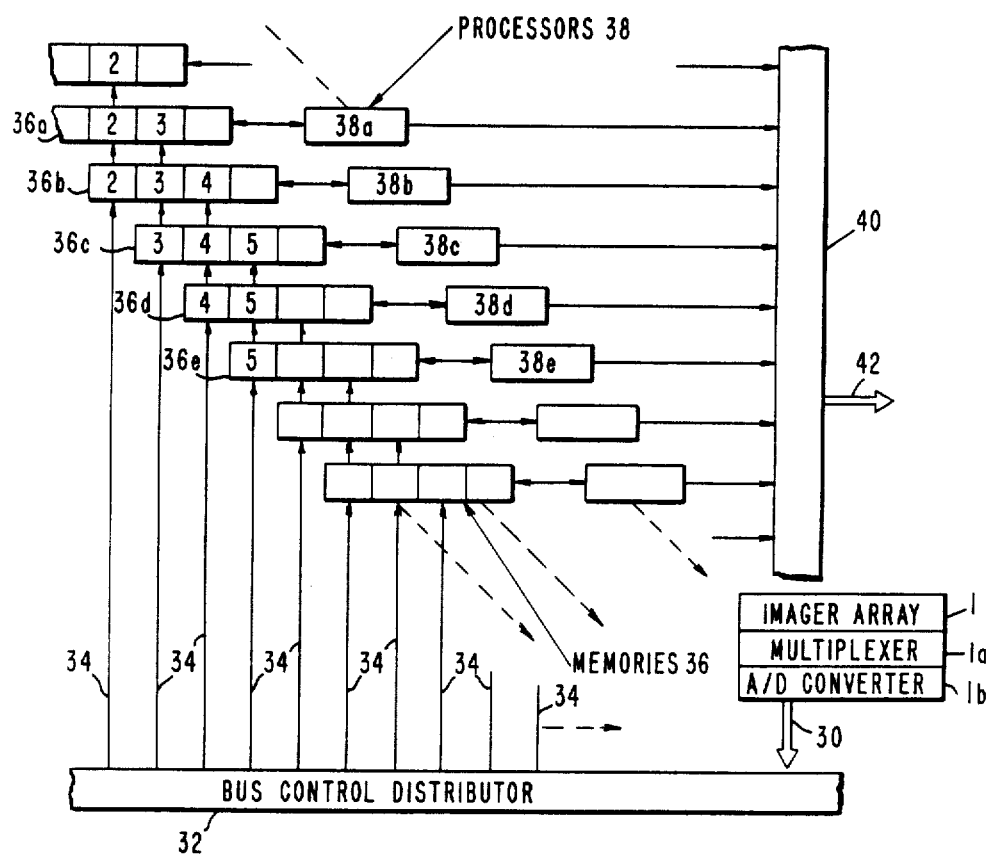
FIG. 3a is a simplified block diagram illustrating the multiple image copying device of the present invention.

The foregoing problems are completely eliminated in the present invention which permits real time image enhancement processing of video data at any video rate using a plurality of programmable processors regardless of the relative slow data rate of the individual processors performing the image enhancement algorithm. Referring to FIG. 3a, the necessity for time-sharing or arbitration among a plurality of processors is eliminated in the present invention by the simultaneous distribution of multiple image copies among the plurality of processors, each processor receiving only a designated portion or block of each video frame. Thus, imager-array 1 has its output serially multiplexed in a multiplexer 1a and digitized in an analog-to-digital converter 1b, to be transmitted through data bus 30 to bus control distributor 32. The bus control distributor 32 sorts out the video data from the imager array 1 by row and distributes selected rows to a plurality of random access memories 36 each individually associated with one of a corresponding plurality of processors 38 programmed to perform an image enhancement algorithm. If, for example, the image enhancement algorithm is a Sobel operator comprising a 3 by 3 matrix which operates on a 3 by 3 kernel of video pixels, the bus control distributor 32 causes 3 rows of the video data words in each video frame (corresponding to 3 rows of pixels 10 in the imager array 1) to be stored sequentially in individual ones of the random access memories 36. For example, random access memory 36a receives the first 3 rows of video data words from the imager array 1, namely rows 1, 2 amd 3 while the second random access memory 36b receives rows 2, 3 and 4, and so forth. Thus, the first processor 38a associated with the first random access memory 36a may access all of the 3 by 3 kernels of video data words necessary to generate an enhanced value for each of the video data words in row 2 of the imager array 1. However, it should be recognized that the invention is equally useful with kernels other than the 3-by-3 kernel discussed in this example and with systems in which data is organized other than by row.

DATA ORGANIZATION

Figure 3B:
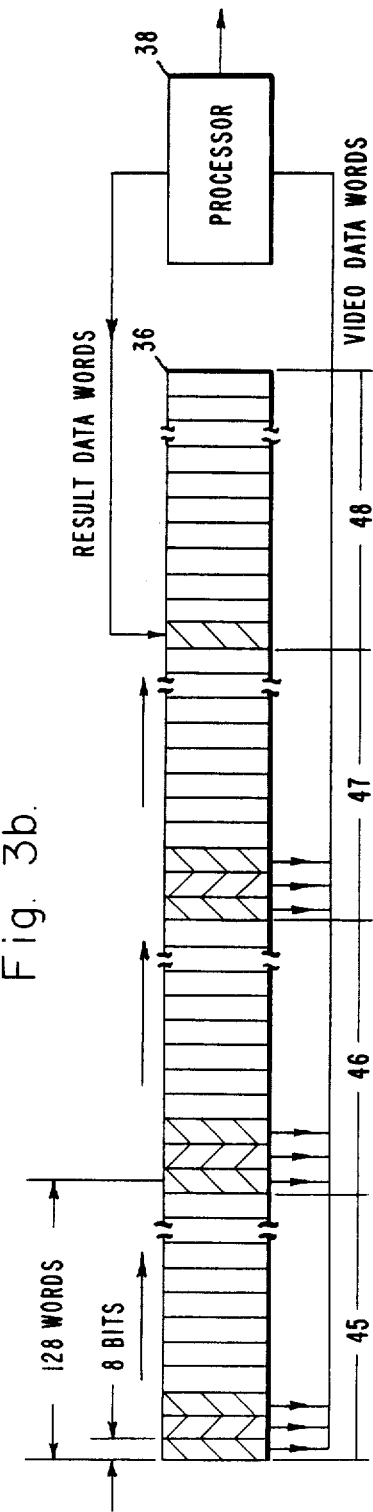
Figure 3C:
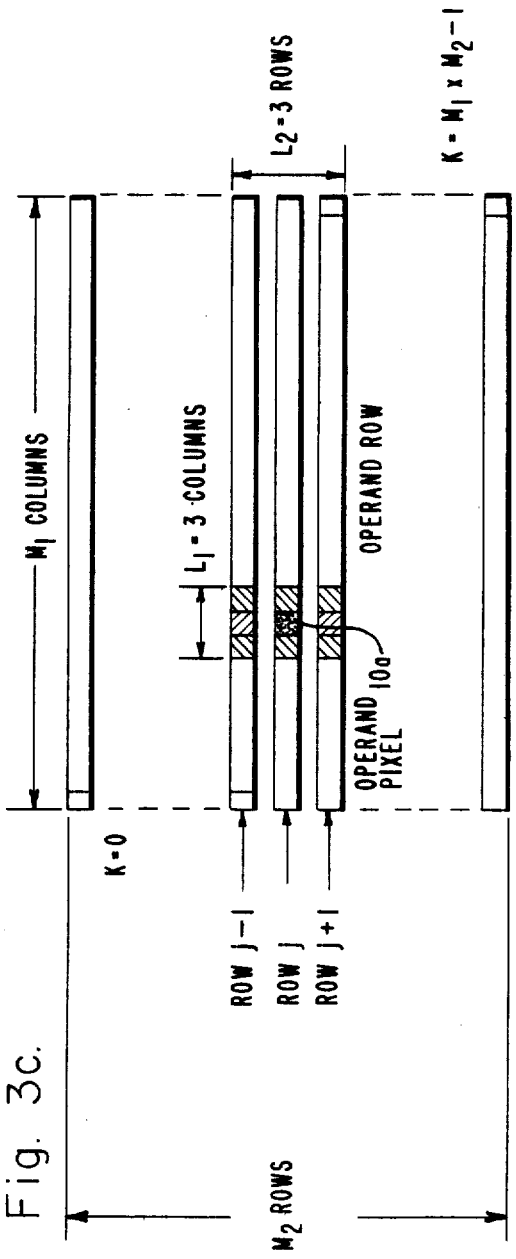
FIG. 3c is a block diagram illustrating the organization of video words in a single video frame as processed in the present invention.

The foregoing is best understood by reference to the example illustrated in FIGS. 3b and 3c which illustrate the application of the invention to an operator requiring a 3-by-3 kernel, as in the example discussed above. FIG. 3b illustrates the organization of random access memory 36a which is similar to the other random access memories 36. The random access memory 36a is divided in this example into four quadrants 45, 46, 47 and 48. The quadrant 45 of the memory 36a stores the video data words from the first row of the video frame, which are sorted and distributed by the bus control distributor 32. Similarly, the second quadrant 46 stores the second row of video data words while the quadrant 47 stores the third row of video data words. The quadrant 48 is reserved for storage of the enhanced value generated for each of the operand video data words in the second row by application of the image processing operator to each 3 by 3 kernel of data words stored in the memory 36a. The processor 38a communicates with the memory 36a to operate on successive 3 by 3 kernels of the video words stored in the quadrants 45, 46 and 47 to generate enhanced value data words to be stored in the quadrant 48.

In one example, the imager 1 comprises 128 rows by 128 columns of pixels and therefore each quadrant 45, 46, 47 and 48 has sufficient memory storage for 128 data words, each word comprising 8 bits representing 256 gray levels as previously discussed. FIG. 3c illustrates the organization of the video data received from each video frame generated by the imager 1. In the general case, there are $M_1$ columns and $M_2$ rows of video data words representing each video frame. The kernel operated upon by the processor 38 comprises $L_1$ columns and $L_2$ rows of video data words and must be moved sequentially from left to right across the $M_1$ columns of video data words. The bus control distributor 32 operates in such a manner that the jth one of the plurality of random access memories 36 receives rows j-1, j and j+1 of the video data words in its first three quandrants 45, 46 and 47, respectively. If the video data words are assigned individual sequential addresses in accordance with their multiplexed sequence, then the address k of the first video data word in each video frame is equal to 1 while the address of the very last video data word in each video data frame is equal to $M_1 \times M_2$, as indicated in FIG. 3c. Furthermore, it should be apparent that the address of the first video data word stored in the jth one of the random access memories 36 is given by $$k = \left(j - \frac{L_2 - 1}{2} + 1\right) M_1 + 1$$

while the address of the last video data word stored in the jth random access memory is given by $$k = \left(j - \frac{L_2 - 1}{2} + 1\right) M_1 + (M_1 \times L_2).$$

Significantly, FIG. 3a shows that copies of each row of video data words are stored in three different random access memories. The number of random access memories 36 into which copies of each row of video data words are simultaneously distributed corresponds to the dimension of the kernel to be operated upon. For example, if a kernel comprising 4 rows and 4 columns of video data words is required by the operator programmed into the processors 38, each row of video data words would be stored in four successive ones of the random access memories 36. The advantage of this simultaneous distribution of video data word copies is that time-sharing of video data words among the plurality of processors 38 or arbitration such as that previously described in connection with FIG. 2 is completely unnecessary. Thus, the only processing to be performed by the plurality of processors 38 is simply the computation of the image enhancement algorithm upon successive kernels already stored in each of the random access memories 36. The number of video frames per second which may be supported by this invention is directly proportional to the number of processors 38 and random access memories 36 to which the bus control distributor 32 simultaneously distributes multiple video data copies.

TIMING

Figure 4:
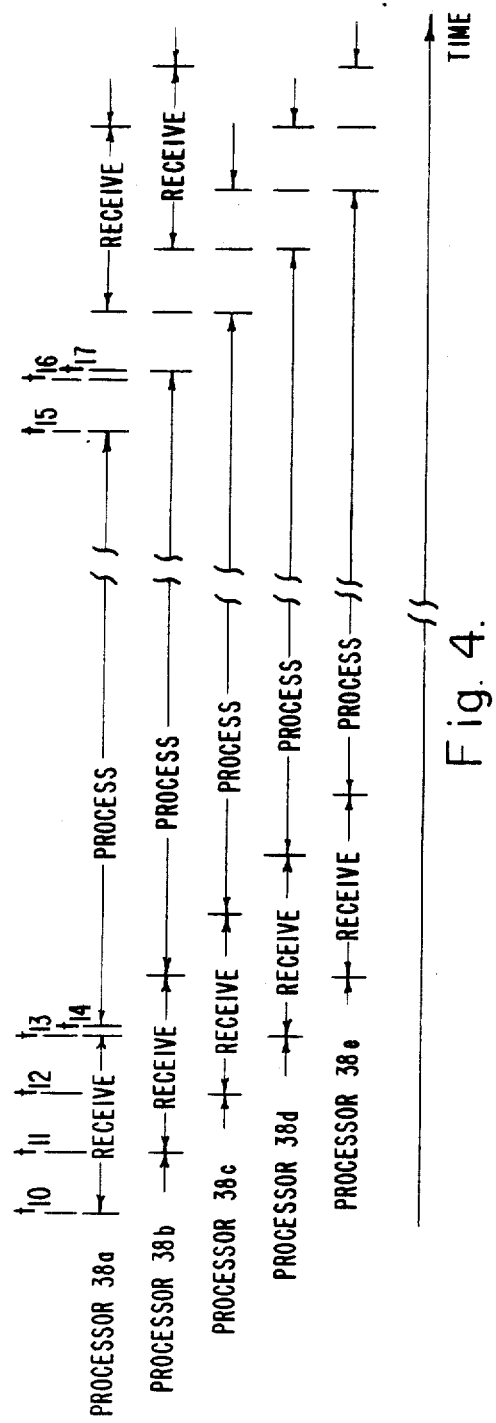

FIG. 4 illustrates the timing of the plurality of processors 38 of FIG. 3a in a short span of time during the transmission a single video frame of data words. At time $t_{10}$ of FIG. 4, the bus control distributor 32 begins loading the third row of video data words into the random access memories 36a, 36b and 36c. At time $t_{11}$ the bus control distributor 32 has completed transmission of the third video data row and begins transmission of the fourth video data word row to the random access memories 36b, 36c and 36d. At time $t_{12}$ transmission of the fourth video data word row is complete and the bus control distributor 32 begins transmission of the fifth video data word row to the random access memories 36c, 36d and 36e. At time $t_{13}$ transmission of the fifth video data word row is complete so that the random access memory 36c contains three complete rows of video data words. The processor 38c immediately begins operating on successive ones of the 3 by 3 kernels surrounding each of the data words in the fourth data word row. Beginning at time $t_{13}$, a 3 by 3 kernel or window of the type illustrated in FIG. 1 is effectively moved from left to right across the three rows of video data words stored in the memory 36c.

Referring to FIG. 3b, a first kernel of the video data words operated upon by the processor 38c is located in the shaded cells of the memory 36c and comprises a total of nine 8-bit words. At time $t_{14}$ the processor 38c has completed operation upon the first kernel to generate an enhanced value comprising one 8-bit result word, which is then stored in the shaded cell of the result quadrant 48 of the random access memory 36c. As soon as the result is thus stored, the processor 38c begins operation upon the second kernel of video data words. At time $t_{15}$ all kernels of video data words stored in the random access memory 36c have been processed by the processor 38c so that the processor 38c causes the result data words stored in the result quadrant 48 of the random access memory 36c to be fetched and transmitted on data collection network 40 to output bus 42. It should be recognized that the number of video data words processed by the processor 38c between times $t_{13}$ and $t_{15}$ defines the average pixel processing rate at which the processor 38c operates. At time $t_{16}$ transmission of the results from the result quadrant 48 of the random access memory 36c has been completed. In the meantime, the adjacent processor 36d has been computing and storing result data words in its random access memory 36d and these are transmitted onto the data collection network 40 beginning at time $t_{17}$.

HIERARCHICAL BUSING

Figure 5A:
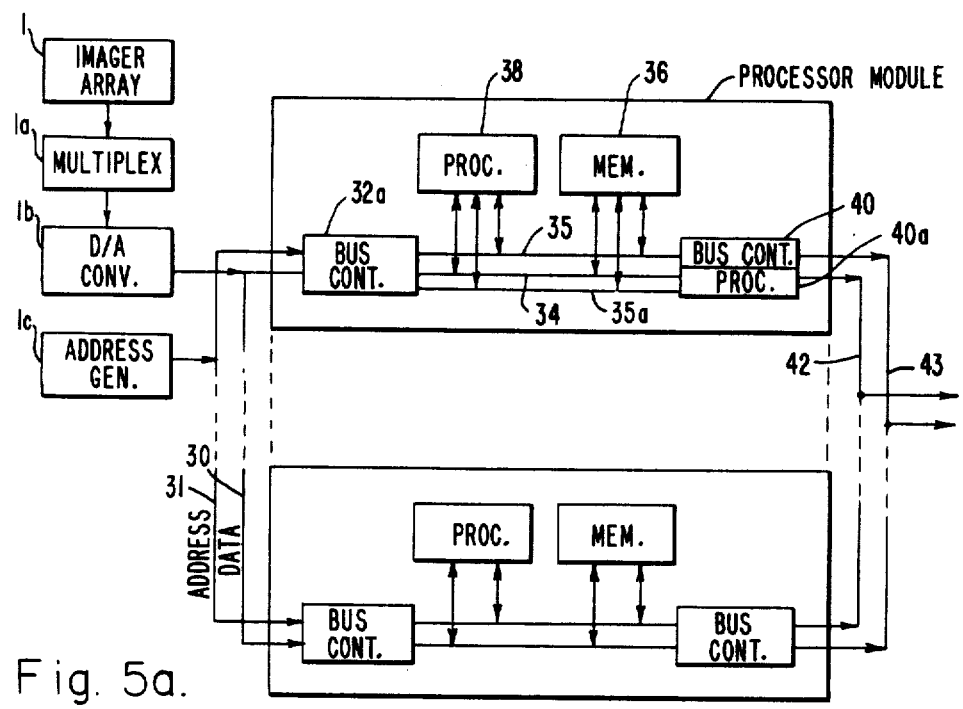
FIG. 5a is a simplified block diagram of the hierarchical busing structure of the present invention.

The hierarchical bus structure of the preferred embodiment of the invention is best illustrated in FIG. 5a. The imager array 1 generates video data words in the multiplexed serial order discussed above which are loaded onto the data bus 30 for simultaneous distribution to a plurality of bus controllers 32a which comprise the bus control distributor 32. Transmission of video data words to each processor/memory pair 38, 36 is controlled by an individual one of the bus controllers 32a. Output of result data words from each processor/memory pair 38, 36 is controlled by an output bus controller 40.

Each bus controller 32a sorts and transmits video data words in a predetermined address range to an individual one of the random access memories 36 for access by an individual one of the processors 38 through a corresponding internal data bus 34. The number of bus controllers 32a corresponds to the number of processors and memory pairs 36, 38, as does the number of internal data buses 34.

The video imager array 1 includes an address generator 1c which generates a 14 bit address word for each video data word, each address word specifing the individual address of each of the approximately 16,000 pixels in the 128 rows and 128 columns of the imager array 1. In the example discussed above, the address generator 1c may instead begin at numeral 0 at the beginning of each video frame and being counting sequentially until $2^{14}-1$ (or $128 \times 128 - 1$) is reached at the end of the video frame, corresponding to the address $k = M_1 \times M_2 - 1 = 2^{14} - 1$ of the last video data word in the video frame. An address bus 31 simultaneously distributes the address of each corresponding video data word to each of the bus controllers 32a. An internal address bus 35 transmits the address of each selected video data word from the corresponding bus controller 32a to the corresponding memory 36 for access by the corresponding processor 38.

BUS CONTROLLERS

Figure 5B:
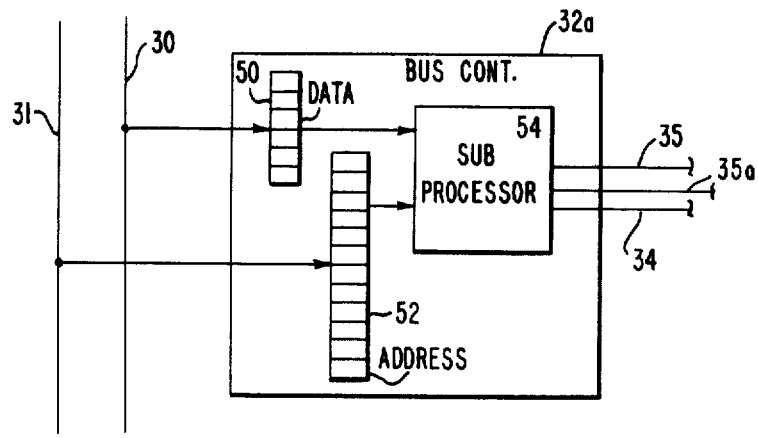

Referring to FIG. 5b, each bus controller 32a includes an 8-bit data register 50 connected to the data bus 30, a 14-bit address register 52 connected to the address bus 31 and a sub-processor 54 connected to both the address and data registers 52, 50, the sub-processor 54 being connected to the corresponding internal data and address buses 34, 35, respectively. The internal sub-processor 54 operates to sort and select certain data words having a predetermined address range individually assigned to the particular bus controller 32a for storage in the corresponding random access memory 36. For example, if the kernel of video data words to be operated upon comprises 3 rows and 3 columns, as in the previous example discussed above, the subprocessor 54 of the jth one of the r bus controllers 32a selects for storage in the jth one of the random memories 36 those data words lying within the address range defining the three rows of video data words $j-1$, $j$ and $j+1$ illustrated in FIG. 3c.

Operation of the sub-processor 54 of the jth one of the r bus controllers 32a is as follows. Each time the video data source 1 transmits one of the video data words in the multiplexed serial sequence discussed above, "copies" of the video data word are distributed simultaneously to all of the bus controllers 32a by the data bus 30. Simultaneously, "copies" of the address word corresponding to the address of the transmitted video data word are simultaneously distributed by the address bus 31 to all of the bus controllers 32a. The video data word appears immediately in the data register 50 of each of the bus controllers 32a while the corresponding address word appears immediately in the address register 52 of each of the bus controllers 32a. Each sub-processor 54 then compares the address k contained in the address register 52 with the assigned address range of its bus controller 32a. It should be apparent that each bus controller 32a and its sub-processor 54 are assigned a different address range depending upon the assigned number j of the bus controller 32a. (Each bus controller 32a is assigned a number, j, between 1 and r, r being the total number of bus controllers 32a. ). If the address k contained in the register 52 does not lie within the assigned range of a bus controller 32a, its sub-processor 54 takes no action and waits for the next video data word and address to appear on the data and address buses 30 and 31 respectively. On the other hand, if the address k contained in the register 52 does lie within the assigned range of the jth bus controller 32a, both the video data word stored in the data register 50 and the address word stored in the address register 52 are sent by its subprocessor 54 to the jth one of the r internal data and address buses 34, 35, respectively, to be stored in the jth one of the r random access memories 36a in a sequentially assigned location determined by the address k of the video data word. This process continues until three complete rows of video data words have been stored in the jth random access memory 36.

The sub-processor 54 of the jth one of the r bus controllers 32a also tests the address of each video data word having an address k lying within its assigned range to determine whether the address is that of the last video data word to be stored in the jth one of the r memories 36. Whenever this test causes the subprocessor 54 of the jth bus controller 32a to determine that its last video data word has been selected, it notifies the jth main processor 38 through a control bus 35a so that the jth processor 38 may commence processing the video data stored in the jth random access memory 36.

An improved version of the bus controller 32a is illustrated in the block diagram of FIG. 5c. Instead of a subprocessor 54 and registers 50, 52, the improved bus controller of FIG. 5c includes a random access memory 55 having its input 55a connected to the address bus 31 and its output 55b connected to control unit 56a of gate 56. The gate 56 has a data input 56b connected to the data bus 30 and a data output 56c connected to the internal data bus 34. The random access memory 55 is programmed to control the transmission of data words through the gate 56 at the control input 56a in response to address words received on the memory input 55a. The memory 55 is programmed so that video data words are stored and transmitted through the gate 56 from the data bus 30 to the internal data bus 34 in the same manner as described above in connection with FIG. 5b. Thus, the address range discussed previously in connection with FIG. 5b would be programmed into the memory 55 of the bus controller of FIG. 5c. Whenever an address word falling within the assigned range is received at the input 55a, the random access memory 55 sends an enabling signal to the control input 56a of the gate 56, causing the gate 56 to transmit the corresponding data word from the data bus 30 to the internal data bus 34.

The internal address bus 35 need not be connected to receive address words directly from the address bus 31. Instead, address words may be independently generated on the internal address bus 35 by the random access memory 55 in accordance with the order of receipt and storage location of the corresponding video data words in the memory 55.

As soon as the jth processor 38 has completed processing all of the video data words stored in the jth random access memory 36, it notifies output bus controller 40. Preferably, the bus controller 32a commands the processor 38 through the control bus 35a to so notify the output bus controller 40. In response the output bus controller 40 transmits in serial sequence each of the result data words stored in the result quadrant 48 of the jth memory 36 onto output data bus 42. In some embodiments of the invention, it may be desirable to simultaneously output each of the corresponding address words onto an output address bus 43 from each of the bus controllers 40. For this purpose, each output bus controller 40 may include a subprocessor 40a connected to the internal data and address buses 34, 35 and connected to the output data and address buses 42, 43. The subprocessor 40a of the jth one of the output bus controllers 40 is programmed to respond to the aforementioned notice given by the jth main processor 38 to access the result data words stored in the result quadrant 48 of the jth memory 36 and to transmit the result words onto the output data bus 42 in sequence of their address, while simultaneously transmitting the corresponding address words onto the output address bus 43.

A significant advantage of the hierarchical busing structure illustrated in FIG. 5a is that, while the input data bus 30 operates at an average pixel processing data rate equal to that of the multiplexed serial output of data words from the imager array 1, the internal data buses 34, following the storage of the selected video data words in each random access memory 36, operate at a pixel processing data rate which is reduced from that of the input data bus 30 by a factor substantially proportional to 1/r, where r is equal to the number of processors 38a. Thus, the busing is divided into a two-level hierarchy, the higher level buses 30 and 42 operating at a high rate corresponding to the rate of the multiplexed serial output of video data words from the imager array 1 while the lower level internal data buses 34 operate at a pixel processing rate which is significantly reduced and is therefore compatible with the computational rate of each of the processors 38. No additional processing time is imposed in this system because each processor and memory pair 38, 36 receives its own individual copy of those data words necessary to form a complete row of kernels. As a result, no time sharing or arbitration is necessary. As discussed previously such time sharing or arbitration would impose delays which would substantially offset the advantage of using a plurality of processors 38.

SYSTEM LAYOUT

The layout of the data and address buses is illustrated in FIG. 6 in which a host computer 60 accesses both the address bus 31 and the data bus 30 through an interface 62 to permit the host computer 60 to program each of the processors 38 and to program the subprocessors 54 in each of the bus controllers 32a. It should be recognized that each of the processors 38 may be a microprocessor which is formed on a miniature semiconductive substrate. The advantage afforded by the control exerted by the host computer 60 over the main processors 38 and the sub-processors 54 is that the image enhancement algorithm performed by each of the main processors 38 may be changed during operation of the imager array 1 so that the user may select different image enhancement algorithms depending upon the condition of the scenes viewed by the imager. For example, the user may select the Sobel operator to be programmed into each of the processors 38. If the results are not desirable, the user may immediately select another algorithm, such as a local averaging algorithm, which would produce a different image in the output video data from the output data bus 42. Other image enhancement algorithms may be programmed into the main processors 38. Such programming may require that the dimensions of the kernel of video data words operated upon by the processors 38 be changed. For example, in the case of the Sobel operator, a 3 by 3 kernel is required. On the other hand, another operator may require a kernel comprising, for example, 5 columns and 5 rows of video data words. Accordingly, the address range assigned to each bus controller 32a must be expanded by re-programming each of the subprocessors 54 so that five rows instead of three rows of video data words are stored in each random access memory 36 in five sets of memory cells for storing five rows of 128 8-bit words plus a sixth set of memory cells for storing 128 8-bit result data words generated by the corresponding processor 38. The host computer 60 may be used to increase or decrease the dimensions of the processing window defining the kernel 20 and to change the image enhancement algorithm stored in each of the main processors 38. Thus, the invention facilitates programmable real time image enhancement processing of video data regardless of the difference between the video data rate and the processor computation rate and further permits the image enhancement algorithm of the processors to be re-programmed by a host computer for immediate change of the image enhancement algorithm and of the dimensions of the kernel to be operated upon.

If it is desired to increase the multiplexed serial data rate of the video data words, it is only necessary to increase the number r of bus controllers 32a, processors 38 and memories 36 so that the quantity 1/r represents the differential pixel processing data rate between the imager array 1 and each individual processor 38. The total number r of processors 38 may be increased until the upper limit of the data rate of either of the sub-processors 40a or 54 is reached. A further increase in the video data rate of the imager array 1 necessitates the use of additional levels of hierarchical busing.

ADDITIONAL HIERARCHICAL BUSSES

Referring to FIG. 7a, an additional (third) level of hierarchical busing is achieved with a plurality of groups 70 of r processor/memory pairs 36, 38 of the type illustrated in FIG. 5a, and a set of data and select buffers 72, each being individually connected between the data and address buses 30, 31 of one group 70 of processor memory pairs 36, 38 and high speed data and address buses 74, 75, respectively, which are in turn connected to the imager array 1. The output data and address buses 42, 43 of each group 70 of processor/memory pairs 36, 38 is connected through an individual data buffer and sequencer 80 to a high speed output bus 82. Each of the data and select buffers 72 shields its corresponding group 70 of processor/memory pairs 36, 38 from the high video data rate of the imager array 1 by selecting only those video data words in each video frame lying in a predetermined address range assigned to the individual buffer 72 for transmission to the corresponding data bus 30. As a result, in a system in which each processor/memory group 70 comprises r processor/memory pairs 36, 38 and in which s processor/memory groups 70 are buffered by s data and select buffers 72 from the imager array 1, the average pixel processing data rate of the internal data buses 34 is reduced from the pixel rate of the imager array 1 by a factor substantially proportional to 1/(r×s). Thus, if the video source 1 generates video words at a rate of d words per second, then the high speed data bus 74 and high speed output data bus 82 has a pixel processing data rate substantially proportional to d words per second while the data buses 30 and output data bus 42 have a reduced pixel processing data rate substantially proportional to d/s words per second and the internal data buses 34 operate at a very low pixel processing data rate equal to d/(r×s) words per second.

DATA AND SELECT BUFFERS

Figure 7B:
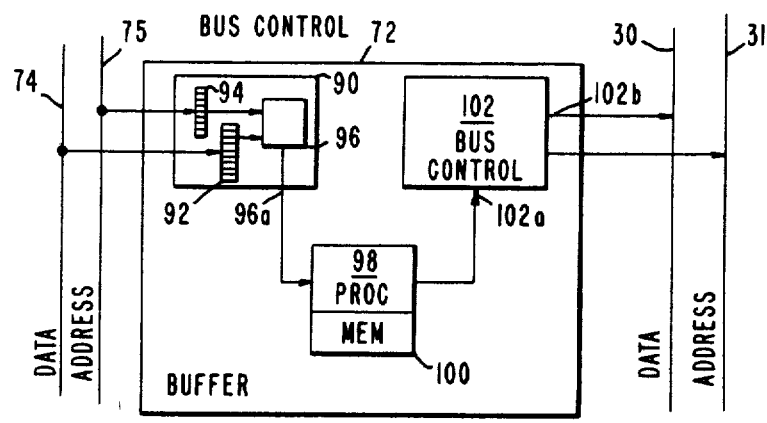

Referring to the simplified schematic diagram of FIG. 7b, each data and select buffer 72 includes a bus controller 90 of the same type as the bus controller 32a illustrated in FIG. 5b, including a data register 92 connected to the data bus 74, an address bus 94 connected to the address bus 75 and a sub-processor 96 connected to both the data and address registers 92, 94. It should be recognized that the bus controller 90 may instead be of the improved type of FIG. 5c. The buffer 72 further includes a buffer processor 98 and a buffer memory 100, each connected to the output 96a of the sub-processor 96. A second bus controller 102 similar to the bus controller 90 has its input 102a connected to the memory 100 and its output 102b connected to the corresponding intermediate data bus 30 and address bus 31. As noted previously, each group 70 of processor/memory pairs illustrated in FIG. 7a is identical to the plurality of processor/memory pairs 38, 36 illustrated in FIG. 5a, including the data and address buses 30, 31 to which the bus controller output 102b is connected.

The internal processor 96 of the buffer bus controller 90 is programmed to accept address words lying in the predetermined address range assigned to its buffer 72, which is different from the address range assigned to others of the plurality of buffers 72. As the imager array 1 generates a video data word, "copies" of this video data word are simultaneously distributed by the data bus 74 to each data register 92 of the plurality of buffers 72. Simultaneously, each address register 94 of the plurality of buffers 72 receives a copy of the corresponding address word from the address bus 75. In a particular one of the buffers 72, if the sub-processor 96 determines that the address word stored in the register 94 lies within the address range assigned to its buffer 72, the sub-processor 96 causes the corresponding video data word in the register 92 to be stored in the buffer memory 100 in a location corresponding to the address word stored in the register 94. On the other hand, if the sub-processor 96 determines that the address word does not lie within the assigned range of its buffer 72, the sub-processor 96 takes no action and simply waits for the occurrence of the next video data word to be generated by the video source 1. As soon as the sub-processor 96 determines that the last video data word in its assigned address range has been stored in the buffer memory 100, it so notifies the output bus controller 102. The output bus controller 102 then proceeds to access each video data word stored in the buffer memory 100 one at a time and transmits the data word onto the data bus 30, simultaneously transmitting the corresponding address word on the address bus 31. At this time, the group 70 of processor/memory pairs begins operating in the manner described above in connection with FIGS. 5a, 5b to transmit result data words on its output data bus 42 and the corresponding address words on the output address bus 43.

Each data buffer and sequencer 80 stores the result data words transmitted on the corresponding output bus 42 in its random access memory 80a. The data buffer and sequencer 80 includes a subprocessor 80b which transmits the result data words stored in the buffer memory 80a onto the high speed output bus 82 in a proper sequence. The result data words are transmitted on the output data bus 42 at an intermediate pixel rate proportional to d/s words per second, and the data buffer and sequencer 80 temporarily stores these result words in its memory 80a. Subsequently, the subprocessor 80b causes the result words so stored to be output onto the high speed output bus 82 at the high video pixel rate proportional to d words per second. Thus, each of the plurality of s data buffers and sequencers 80 temporarily controls the high speed output data bus 82 during a short time window required to transmit the result words stored in its memory 80a at the high video data rate. After the result data words stored in one data buffer and sequencer 80 have been transmitted sequentially onto the high speed output data bus 82, the adjacent data buffer and sequencer 80' takes control of the high speed output data bus 82 and transmits the result data words stored in its memory 80a' in the same manner under control of its subprocessor 80b'.

The advantage gained by using the plurality of buffers 72 is that the pixel processing data rate of the data bus 30 is reduced from the pixel rate of the high speed data bus 74 by a factor substantially proportional to 1/s, where s is the total number of buffers 72 connected to the data bus 74.

As already noted, each data word is assigned an address k corresponding to its order of occurrence in the multiplexed serial output of video data words generated by the imager array 1. Each buffer 72 will transmit to the corresponding data bus 30 only those video data words having addresses k within its individually assigned address range. Each buffer 72 is assigned a sequential number in the range of 1 through s (s being the total number of buffers 72).

A host computer 60 illustrated in FIG. 7a may be connected to the data and address buses 74, 75 through an interface 62. The host computer may be used to rapidly program or reprogram each of the buffer sub-processors 96, the bus control sub-processors 54 and the main processors 38. Thus, the host computer 60 would program each buffer processor 90 to respond to address words stored in its address register 94 which lies in its assigned address range according to the formula given above. Also, the host computer may program the sub-processors 54 and the main processors 38 in the manner previously described to permit the user to change the image enhancement algorithm rapidly during operation.

What is claimed is:

1. An imaging system wherein video data from each video frame of video data words is multiplexed serially by a row, including means for enhancing said video data by operating on successive kernels of said data words, comprising:

a plurality of main processors and memories individually associated with said processors, each of said processors corresponding to an individually assigned block of video data words in said frame;

a plurality of bus control means, individually associated with said processors, each one of said bus control means for selecting those data words from said video data words which lie within the corresponding assigned data word block;

data bus means for simultaneously distributing each of said data words to said k bus control means; and a plurality of internal data bus means individually associated with said plurality of bus control means, each of said internal data bus means for carrying the selected ones of said data words from the corresponding bus control means to the corresponding one of said memories and for permitting the corresponding one of said processors to access data words in said corresponding memory, wherein each processor is programmed with selected operator means for generating an enhanced value from each kernel of data words stored in the corresponding memory.

2. The imaging system of claim 1 further comprising host computer means for programming said main processors, wherein a different image processing algorithm may be substituted into said main processors.

3. The imaging system of claim 1 wherein each of said bus control means comprise a sub-processor.

4. The imaging system of claim 3 wherein said host computer means for programming programs said sub-processor.

5. A video imager having the capability to perform programmable image enhancement in real time, comprising:

a source of video data words representing an array of columns and rows of data words, said source being organized serially by rows;

a plurality of r main processors, each programmed to operate on a kernel comprising a specific number of said columns and rows of said data words, each kernel being disposed symmetrically with respect to an operand one of said data words and each of said processors corresponding to an individually assigned block of data words in said video source;

a plurality of memories, each utilized by one of said processors;

a plurality of bus control means each individually associated with one of said processors, each one of said bus control means for selecting those data words from said video source which lie within the data word block corresponding to one of said processors;

data bus means for simultaneously distributing each of said data words to said bus control means; and a plurality of internal data bus means, each one of said internal data bus means for carrying the selected ones of said data words from the corresponding bus control means to the corresponding one of said memories and for permitting the corresponding one of said processors to access data words in said one memory, wherein each processor is programmed with selected operating means for generating an enhanced value from each kernel stored in the corresponding memory.

6. The device of claim 5, further comprising:

a plurality of internal address bus means, each one of said internal address bus means for carrying the address words corresponding to the selected data words from one of said bus control means to the corresponding memory and for permitting the corresponding processor to access address words in said corresponding memory.

7. The imager of claim 6 wherein the jth one of said bus control means comprises:

a data register connected to said data bus means;

an address register connected to said address bus means;

an internal sub-processor connected to said data and address registers and connected to said internal data bus means, said internal sub-processor comprising:

means for determining whether the contents k of said address register lies within a predetermined address range; and means for fetching the contents of said data register and putting it on said internal bus means in response to said determining means.

8. The device of claim 7 wherein said internal subprocessors are programmable to permit a selection of the size of the kernel operated upon by said main processors.

9. The device of claim 7 wherein said host computer means for programming programs said internal subprocessors.

10. The device of claim 9 wherein said first buffer bus control means comprises a buffer processor.

11. The device of claim 10 wherein said host computer means for programming programs said buffer processor.

12. The device of claim 5 wherein said data bus means has a first pixel processing data rate corresponding to the data rate of said video data word source, and said internal bus means has a second pixel processing data rate reduced from said first data rate by an amount substantially proportional to the number of said bus control means, said second pixel processing data rate being compatible with the computation rate of said processors.

13. The device of claim 5 wherein said data bus means further comprises a plurality of s buffers, each of said buffers controlling transmission between said video data word source and a fractional plurality of said bus control means, each of said buffers comprising:
a buffer memory;
a first buffer bus control means connected to said data bus means for receiving data words from said video data word source and for selecting and storing in said buffer memory those data words lying within an individually assigned block of data words in said array;
an intermediate output bus connected to said fractional plurality of said bus control means;
a second buffer bus control means connected between said buffer memory and said intermediate bus, said second buffer bus control means for transmitting the data words stored in said buffer memory to said intermediate bus, wherein said data bus has a first pixel processing data rate corresponding to the data rate of said video source, said intermediate data bus has a second pixel processing data rate substantially reduced from said first rate by a factor proportional to $1/s$, and said internal data bus means has a pixel processing data rate further substantially reduced from said first data rate by a factor proportional to $1/(r \times s)$.

14. The device of claim 13 wherein said fractional plurality is proportional to $r/s$.

15. The device of claim 5 wherein each of said main processors are programmed to perform a Sobel operation upon each of said kernels to enhance edge detection by said imager.

16. The device of claim 5 further comprising host computer means for programming said plurality of r main processors.

* * * * *